United States Patent
Tang et al.

(10) Patent No.: US 7,301,253 B2
(45) Date of Patent: Nov. 27, 2007

(54) VEHICLE ELECTRIC FAN MOTOR WITH UNIVERSAL MOUNT

(75) Inventors: Xian Zhou Tang, Sheng Zhou (CN); Sheng Chiao, Walnut, CA (US)

(73) Assignees: S&S Marketing, Inc., Walnut, CA (US); Tang, Xian Zhou, Sheng Zhou, ZheJiang Provience ( * ) Notice: Subject to any disclaimer, the term of this patent is extended or adjusted under 35 U.S.C. 154(b) by 389 days.

(21) Appl. No.: 11/131,050

(22) Filed: May 16, 2005

(65) Prior Publication Data

US 2006/0255671 A1    Nov. 16, 2006

(51) Int. Cl.
*H02K 5/00* (2006.01)
*H02K 5/15* (2006.01)

(52) U.S. Cl. ............ 310/91; 310/89; 417/423.15; 417/423.14; 417/423.7; 417/363; 248/603; 248/645

(58) Field of Classification Search ............ 310/89, 310/91; 248/603, 645; 417/423.15, 423.14, 417/423.7, 363
See application file for complete search history.

(56) References Cited

U.S. PATENT DOCUMENTS

| | | | | |
|---|---|---|---|---|
| 3,773,285 A | * | 11/1973 | Morrill ............ | 248/603 |
| 3,787,014 A | * | 1/1974 | Story et al. ............ | 248/558 |
| 3,830,595 A | * | 8/1974 | Carpenter et al. ............ | 417/363 |
| 4,174,821 A | * | 11/1979 | Levine ............ | 248/661 |
| 4,452,417 A | * | 6/1984 | Krafthefer et al. ............ | 248/604 |
| 4,806,811 A | * | 2/1989 | Mayumi et al. ............ | 310/89 |
| 6,031,306 A | * | 2/2000 | Permuy ............ | 310/67 R |
| 2006/0255671 A1 | * | 11/2006 | Tang et al. ............ | 310/89 |

FOREIGN PATENT DOCUMENTS

| | | | |
|---|---|---|---|
| EP | 878 644 | * | 5/1997 |
| JP | 05-264055 | * | 10/1993 |

* cited by examiner

*Primary Examiner*—Karl Tamai
(74) *Attorney, Agent, or Firm*—Raymond Y. Chan; David and Raymond Patent Group

(57) ABSTRACT

A vehicle fan motor for an electric fan assembly includes a motor housing, a motor assembly enclosed in the motor housing, and a universal mounting arrangement radially and outwardly extended from the motor housing for securely mounting the motor housing to the electric fan assembly. The universal mounting arrangement contains first through sixth alignment holes radially and spacedly provided on a circumferential side of the motor housing. Therefore, the motor housing is adapted for securely mounting to the electric fan assembly having three mounting holes when the first, third and fifth alignment holes of the universal mounting arrangement are coaxially aligned with the three mounting holes respectively, and the motor housing is adapted for securely mounting to the electric fan assembly having four mounting holes when the first, second, fourth and sixth alignment holes of the universal mounting arrangement are coaxially aligned with the four mounting holes respectively.

20 Claims, 5 Drawing Sheets

VEHICLE ELECTRIC FAN MOTOR WITH UNIVERSAL MOUNT

BACKGROUND OF THE PRESENT INVENTION

1. Field of Invention

The present invention relates to a vehicle electric fan motor, and more particularly to a vehicle electric fan motor with universal mount, which is adapted to mount to an electric fan with either three-hole or four-hole structure so as to securely mount the fan motor to the electric fan while being cost effective.

2. Description of Related Arts

A cooling system for vehicle generally comprises an electric fan and fan motor driving the electric fan to operate such that the electric fan generates a flow of fresh air for cooling the engine of the vehicle.

A conventional fan motor comprises a motor housing having a front casing and a rear cover sealedly covering to the front casing, a motor assembly received in the motor housing and a mounting unit securely mounted the motor housing to the electric fan, wherein a driving shaft is extended from the motor assembly to couple with the electric fan through the front casing of the motor housing to drive the electric fan to rotate.

Accordingly, there are two types of electric fan, which are three-hole structural electric fan and four-hole structural electric fan. The three-hole structural electric fan contains three mounting holes for the fan motor mounting thereto. The mounting unit comprises three hole-planes integrally and outwardly extended from the rear cover of the motor housing to align with the three mounting holes of the electric fan respectively such that a plurality of mounting elements, such as screws, are securely affixed the motor housing to the electric fan through the mounting holes and the hole-planes. Likewise, the four-hole structural electric fan contains four mounting holes for the fan motor mounting thereto. The mounting unit comprises four hole-planes integrally and outwardly extended from the rear cover of the motor housing to align with the four mounting holes of the electric fan respectively such that the mounting elements are securely affixed the motor housing to the electric fan through the mounting holes and the hole-planes.

However, such electric fan has several drawbacks. When one of the electric fan and the fan motor must be replaced due to the malfunction thereof, the machinist must find the corresponding parts to match the electric fan with the fan motor. In other words, if the three-hole structural electric fan is malfunctioned, a new three-hole structural electric fan is required to be substituted in order to match with the three-hole mounting unit of the fan motor. Also, the machinist may merely keep both three-hole fan motor and four-hole fan motor in stock because the three-hole fan motor only fits for the three-hole structural electric fan and the four-hole fan motor only fits for the four-hole structural electric fan. In other words, they are unique and are not interchangeably use.

Furthermore, due to the vibration of the electric fan, one of the hole-planes may easily be broken through the respective mounting element. Since the hole-plane is integrally extended from the rear cover of the motor housing, the broken hole-plane may cause the fan motor detaching from the electric fan. In other words, one of the hole-planes is broken, the rear cover may disengage with the front casing that the motor assembly will expose to outside and the driving shaft may misalign with the electric fan as well. Therefore, the tiny hole-plane becomes the essential component of the cooling system of the vehicle that the broken hole-plane may cause the entire cooling system malfunctioning.

SUMMARY OF THE PRESENT INVENTION

A main object of the present invention is to provide a vehicle electric fan motor with universal mount, which is adapted to mount to an electric fan assembly with either three-hole or four-hole structure so as to securely mount the fan motor to the electric fan assembly while being cost effective.

Another object of the present invention is to provide a vehicle electric fan motor with universal mount, which contains six spaced apart alignment holes selectively aligning with the mounting holes of the electric fan assembly, wherein when one of the alignment holes is aligned with one of the mounting holes of the electric fan assembly, the rest of the alignment holes are automatically aligned with the rest of the mounting holes. Therefore, without any pre-measurement, the fan motor is easily to be installed into the electric fan assembly either having three-hole or four-hole structure.

Another object of the present invention is to provide a vehicle electric fan motor with universal mount, wherein the universal mount provides two independent locking systems to securely mounted the front casing to the rear housing for enclosing the motor assembly and to securely mount the motor housing to the electric fan assembly respectively. Therefore, the present invention prevents the malfunction of the cooling system of the vehicle caused by the broken part due to the vibration of the electric fan assembly.

Another object of the present invention is to provide a vehicle electric fan motor with universal mount which does not involve complicated mounting structure so as to minimize the manufacturing cost of the present invention.

Another object of the present invention is to provide a vehicle electric fan motor with universal mount, wherein no expensive or mechanical structure is required to employ in the present invention in order to achieve the above mentioned objects. Therefore, the present invention successfully provides an economic and efficient solution for providing reinforced mounting configuration between the fan motor and the electric fan assembly.

Accordingly, in order to accomplish the above objects, the present invention provides a vehicle fan motor for an electric fan assembly, comprising:

a motor housing;

a motor assembly enclosed in the motor housing, wherein a driving shaft is driven to rotate by the motor assembly and is extended out of the motor housing for coupling with the electric fan assembly; and a universal mounting arrangement, which is radially and outwardly extended from the motor housing for securely mounting the motor housing to the electric fan assembly to substantially retain the driving shaft in position, containing a first alignment hole, a second alignment hole spaced apart from the first alignment hole at a 90° arc angle, a third alignment hole spaced apart from the first alignment hole at a 120° arc angle, a fourth alignment hole spaced apart from the first alignment hole at a 180° arc angle, a fifth alignment hole spaced apart from the first alignment hole at a 240° arc angle, and a sixth alignment hole spaced apart from the first alignment hole at a 270° arc angle, wherein the motor housing is adapted for securely mounting to the electric fan assembly having three mounting holes when the first, third and fifth alignment holes of the universal mounting arrangement are coaxially aligned with the three mounting holes respectively, wherein the motor housing is adapted for securely mounting to the electric fan assembly having four mounting holes when the first, second, fourth and sixth alignment holes of the universal mounting arrangement are coaxially aligned with the four mounting holes respectively.

These and other objectives, features, and advantages of the present invention will become apparent from the following detailed description, the accompanying drawings, and the appended claims.

DETAILED DESCRIPTION OF THE PREFERRED EMBODIMENT

Figure 1:
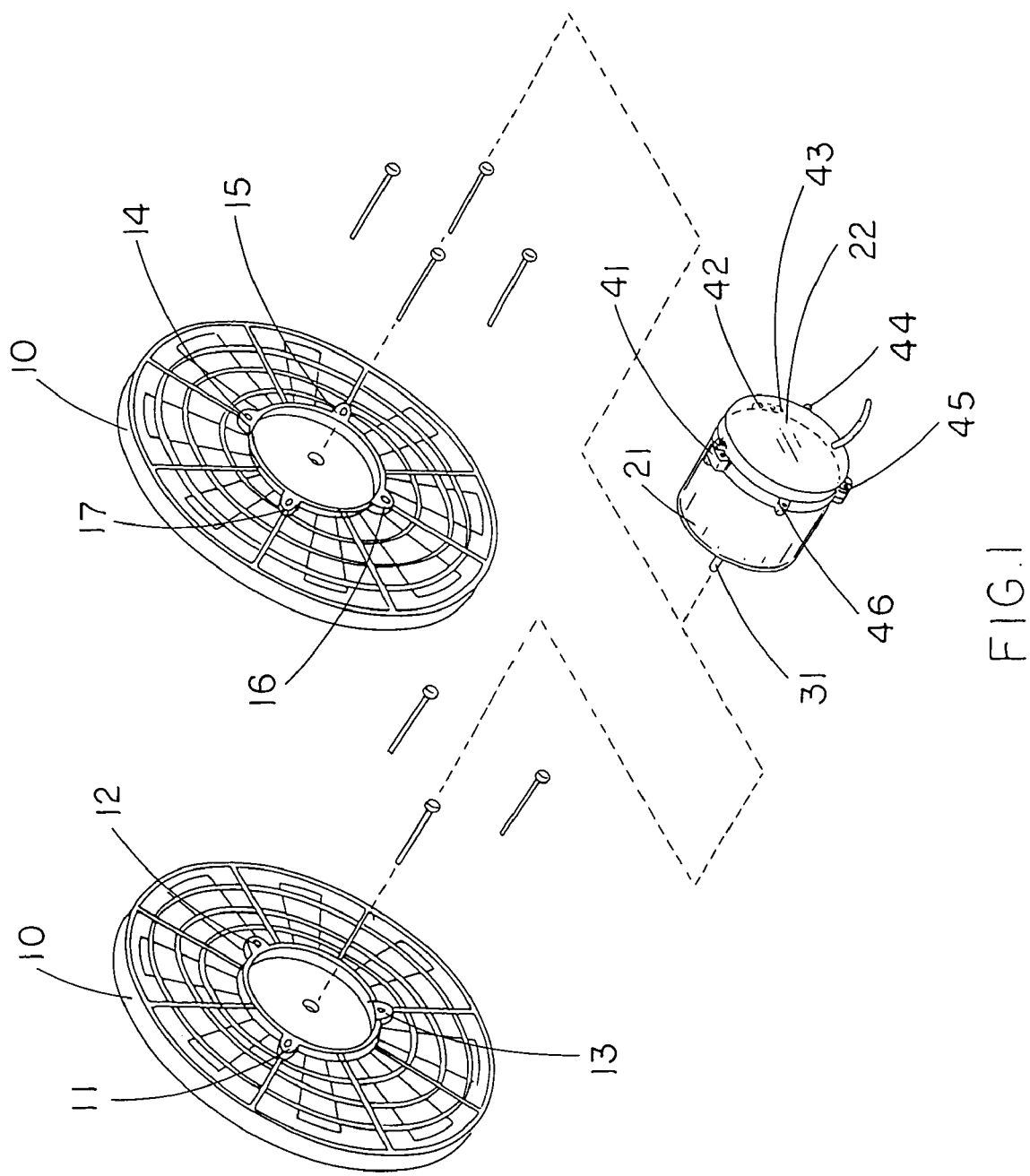
FIG. 1 is a perspective view of a vehicle fan motor for an electric fan assembly according to a preferred embodiment of the present invention.
Figure 2:
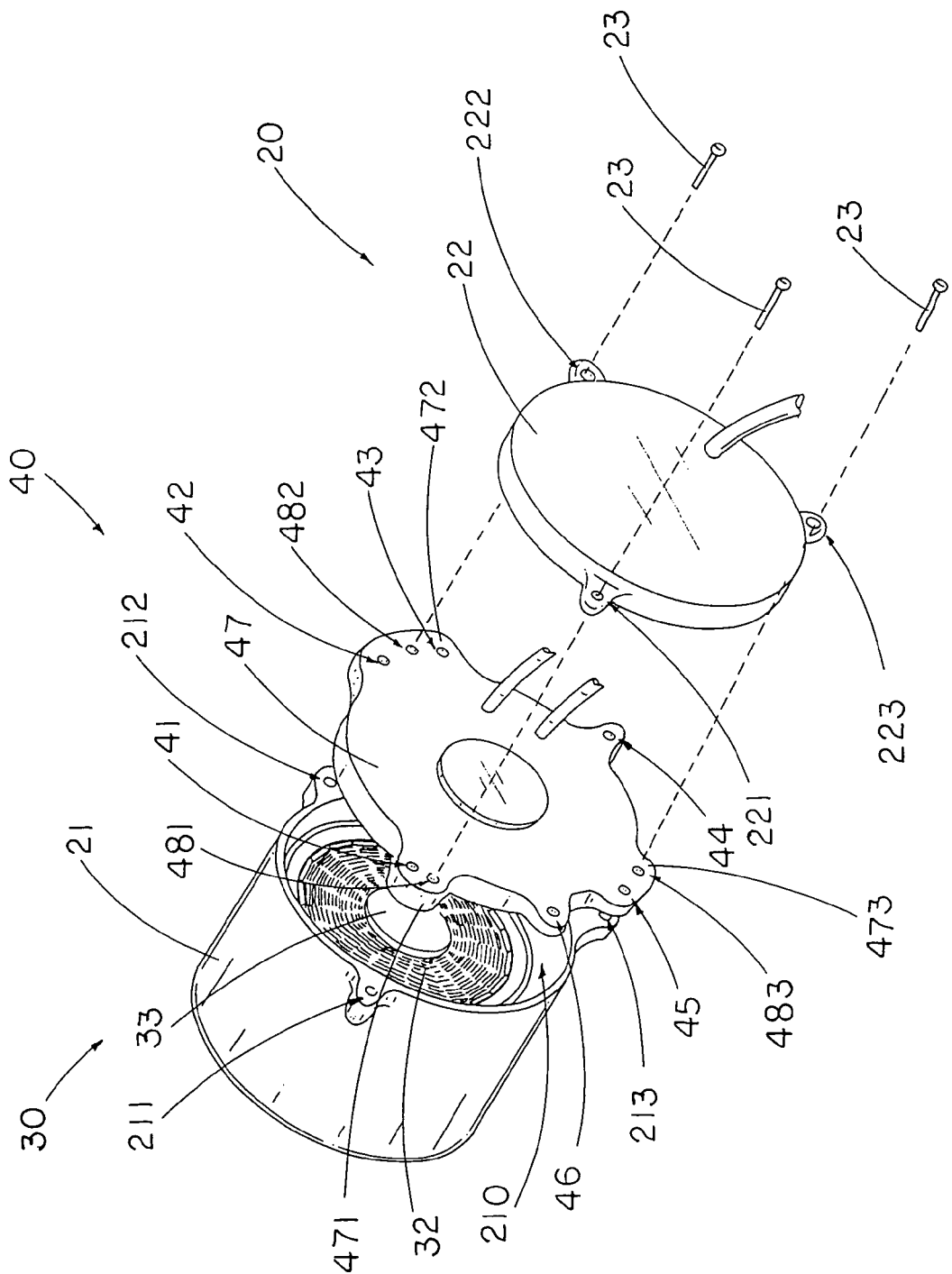
FIG. 2 is an exploded perspective view of the vehicle fan motor according to the above preferred embodiment of the present invention.
Figure 3:
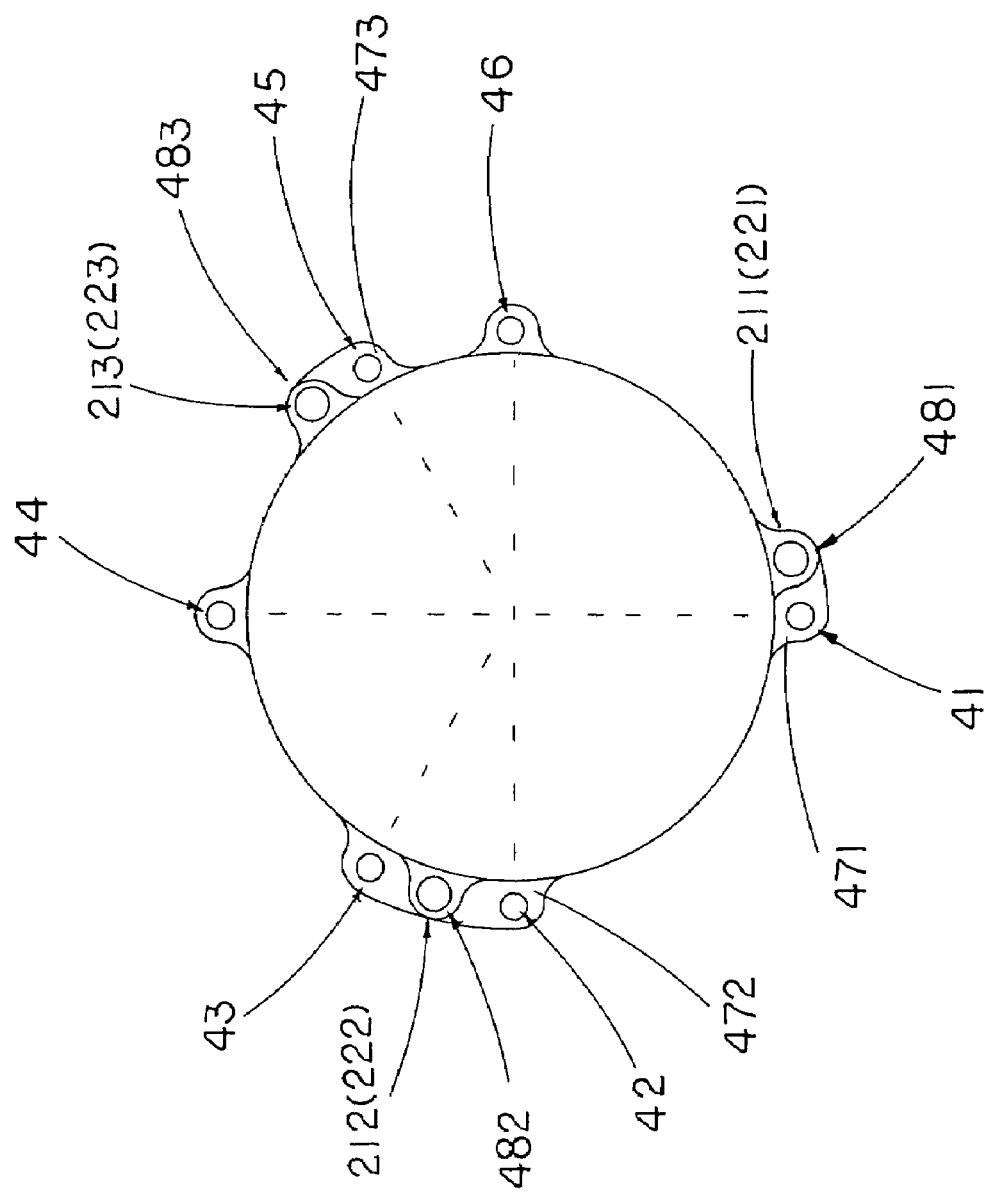
FIG. 3 is a schematic view of the universal mounting arrangement of the vehicle fan motor according to the above preferred embodiment of the present invention, illustrating the configuration of the first through sixth alignment holes.

Referring to FIGS. 1 to 3 of the drawings, a vehicle fan motor for an electric fan assembly 10 according to a preferred embodiment of the present invention is illustrated, wherein the vehicle fan motor comprises a motor housing 20 and a motor assembly 30 enclosed in the motor housing 20, wherein a driving shaft 31 is driven to rotate by the motor assembly 30 and is extended out of the motor housing 20 for coupling with the electric fan assembly 10.

The vehicle fan motor further comprises a universal mounting arrangement 40, which is radially and outwardly extended from the motor housing 20 for securely mounting the motor housing 20 to the electric fan assembly 10 to substantially retain the driving shaft 31 in position, containing a first alignment hole 41, a second alignment hole 42 spaced apart from the first alignment hole 41 at a 90° arc angle, a third alignment hole 43 spaced apart from the first alignment hole 41 at a 120° arc angle, a fourth alignment hole 44 spaced apart from the first alignment hole 41 at a 180° arc angle, a fifth alignment hole 45 spaced apart from the first alignment hole 41 at a 240° arc angle, and a sixth alignment hole 46 spaced apart from the first alignment hole 41 at a 270° arc angle. In other words, the first through sixth alignment holes 41~46 are radially and spacedly extended from a circumferential side of the motor housing 20.

Figure 4:
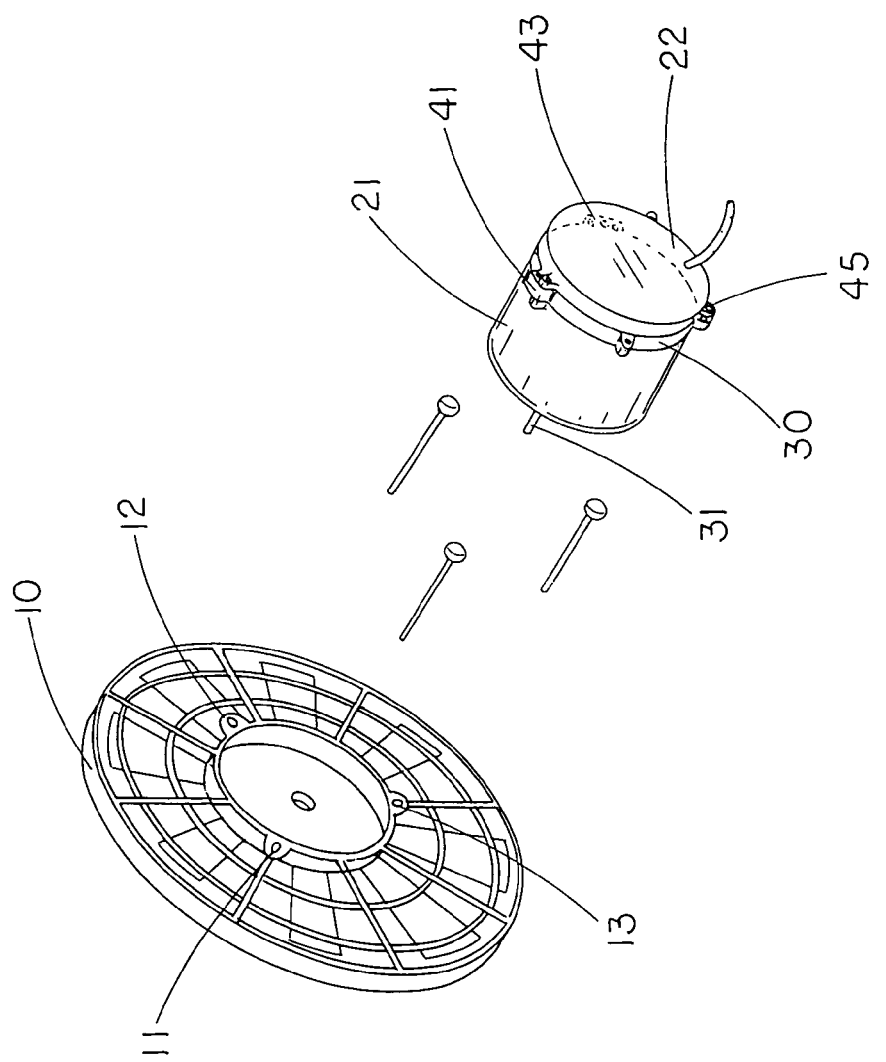
FIG. 4 illustrates the vehicle fan motor mounting to the electric fan assembly having three mounting holes according to the above preferred embodiment of the present invention.
Figure 5:
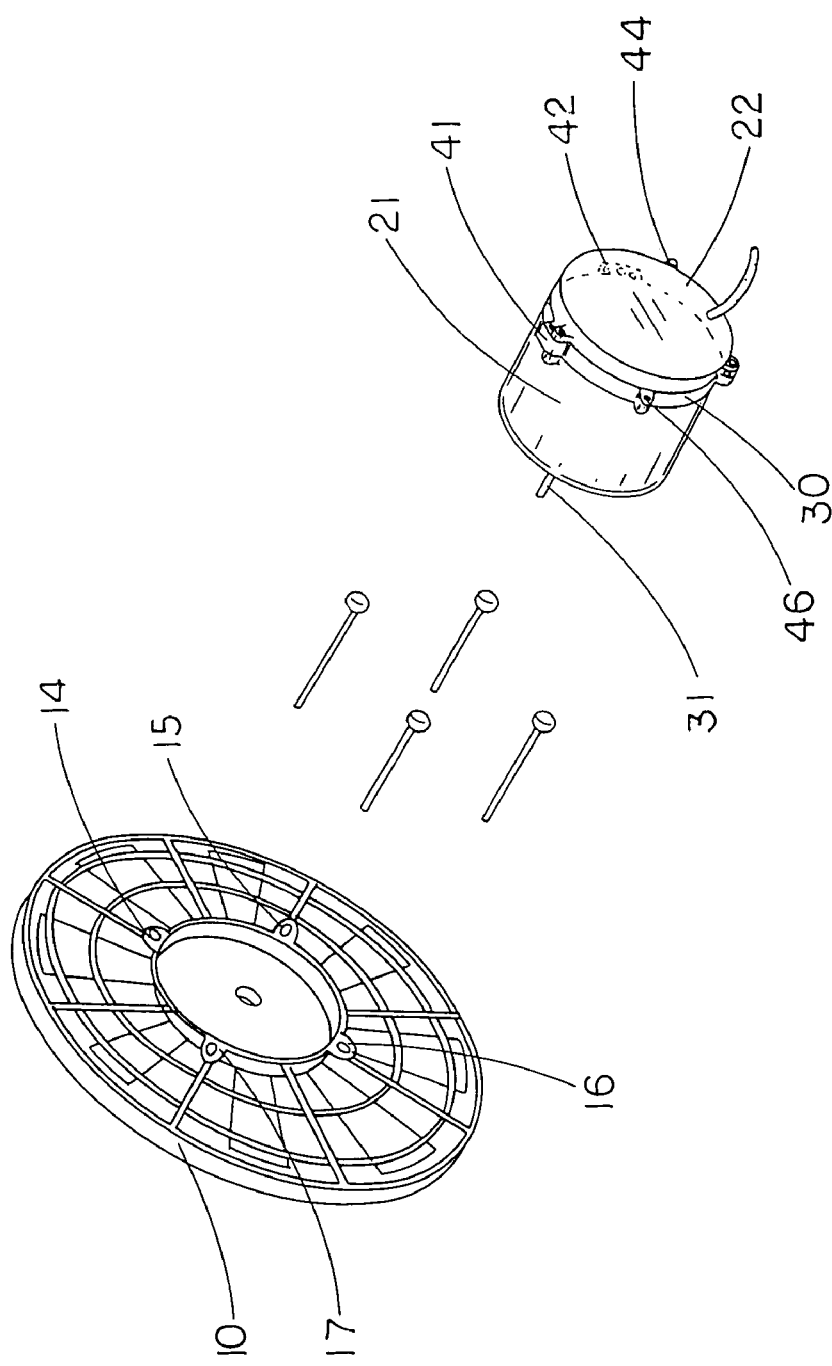
FIG. 5 illustrates the vehicle fan motor mounting to the electric fan assembly having four mounting holes according to the above preferred embodiment of the present invention.

Accordingly, the motor housing 20 is adapted for securely mounting to the electric fan assembly 10 having three mounting holes 11, 12, 13 when the first, third and fifth alignment holes 41, 43, 45 of the universal mounting arrangement 40 are coaxially aligned with the three mounting holes 11, 12, 13 respectively, as shown in FIG. 4. The motor housing 20 is adapted for securely mounting to the electric fan assembly 10 having four mounting holes 14, 15, 16, 17 when the first, second, fourth and sixth alignment holes 41, 42, 44, 46 of the universal mounting arrangement 40 are coaxially aligned with the four mounting holes 14, 15, 16, 17 respectively, as shown in FIG. 5.

The electric fan assembly 10 generally comprises a fan unit and a fan shroud. The three mounting holes 11, 12, 13 are spacedly formed on the fan shroud to form the three-hole structural electric fan assembly 10. The four mounting holes 14, 15, 16, 17 are spacedly formed on the fan shroud to form the four-hole structural electric fan assembly 10. Accordingly, the driving shaft 31 is coupled with the fan unit to drive the fan unit to rotate when the vehicle fan motor operates.

According to the preferred embodiment, the motor housing 20 comprises a front casing 21 defining a motor cavity 210 receiving the motor assembly 30 therein and a rear cover 22 covering the front casing 21 to enclose the motor cavity 210 so as to sealedly support the motor assembly 30 in the motor housing 20.

In order to securely mount the rear cover 22 to the front casing 21, the front casing 21 contains at least three casing holes 211, 212, 213 extended radially and the rear cover 22 contains at least three corresponding covering holes 221, 222, 223 extended radially to coaxially align with the casing holes 211, 212, 213 respectively. Therefore, three affixing elements 23, such as bolt and nut, are adapted to securely mount the rear cover 22 to the front casing 21 through the casing holes 211, 212, 213 and the covering holes 221, 222, 223.

The motor assembly 30 according to the preferred embodiment is embodied as a brushless motor assembly which comprises a stator unit 32 and a rotor unit 33 driven to be rotated within the stator unit 32 by means of magnetic strength therebetween so as to drive the driving shaft 31 to rotate.

The universal mounting arrangement 40 comprises a mounting ring 47 sealedly mounted between the front casing 21 and the rear cover 22 wherein the first through sixth alignment holes 41~46 are spacedly and radially extended around the mounting ring 47.

According to the preferred embodiment, the universal mounting arrangement 40 further comprises first through third mounting wings 471, 472, 473 radially and outwardly extended from the motor housing 20, wherein the first alignment hole 41 is formed on the first mounting wing 471, the second and third alignment holes 42, 43 are spacedly formed on the second mounting wing 472, and the fifth alignment hole 45 is formed on the third mounting wing 473. As shown in FIGS. 2 and 3, the first through third mounting wings 471, 472, 473 are radially extended from mounting ring 47 to align the first through sixth alignment holes 41~46 with the mounting holes 11~17 of the electric fan assembly 10.

As shown in FIG. 3, the universal mounting arrangement 40 further contains first through third retention holes 481, 482, 483, wherein the first retention hole 481 is formed on the first mounting wing 471 next to the first alignment hole 41 to coaxially align between the first casing hole 211 and the first covering hole 221, wherein the second retention hole 482 is formed on the second mounting wing 472 at a position between the second and third alignment holes 42, 43 to coaxially align between the second casing hole 212 and the second covering hole 222, wherein the third retention hole 483 is formed on the third mounting wing 473 next to the fifth alignment hole 45 to coaxially align between the third casing hole 213 and the third covering hole 223. Therefore, when the rear cover 22 is securely mounted to the front casing 21 via the affixing elements 23, the mounting ring 47 is substantially mounted between the rear cover 22 and the front casing 21 through the first through third retention holes 481, 482, 483, so as to retain the universal mounting arrangement 40 in position. In other words, the mounting ring 47 can be incorporated with the conventional fan motor as an add-on component to fit both the three-hole structural electric fan assembly 10 and the four-hole structure structural electric fan assembly 10.

It is worth to mention that the housing-mounting structure between the front casing 21 and the rear cover 22 is configured by the casing holes 211, 212, 213, the covering holes 221, 222, 223, and the retention holes 481, 482, 483. The fan-mounting structure between the motor housing 20 and the electric fan assembly 10 is configured by the first through sixth alignment holes 41~46 and the mounting holes 11~17. Therefore, the housing-mounting structure is independent to the fan-mounting structure such that even one of the housing-mounting structure and the fan-mounting structure is damaged by the vibration of the electric fan assembly 10, another mounting structure will remain in secure-condition so as to prevent the accidental damage of the electric fan assembly 10 and/or the motor assembly 30.

As shown in FIG. 4, in order to install the vehicle fan motor of the present invention into the three-hole structural electric fan assembly 10, the motor housing 20 is placed to the electric fan assembly 10 to couple the driving shaft 21 with the electric fan assembly 10, wherein the motor housing 20 is adjusted at a position that the first alignment hole 41 is coaxially aligned with one of the mounting holes 11. Once the alignment between the first alignment hole 41 and the mounting hole 11 is correct, the third and fifth alignment holes 43, 45 are automatically and coaxially aligned with the rest two mounting holes 12, 13. Therefore, no pre-measurement of the holes is required to align each of the mounting holes 11, 12, 13 with the corresponding alignment hole 41~46.

As shown in FIG. 5, for installing the vehicle fan motor of the present invention into the four-hole structural electric fan assembly 10, the motor housing 20 is placed to the electric fan assembly 10 to couple the driving shaft 21 with the electric fan assembly 10, wherein the motor housing 20 is adjusted at a position that the first alignment hole 41 is coaxially aligned with one of the mounting holes 14. Once the alignment between the first alignment hole 41 and the mounting hole 14 is correct, the second, fourth and sixth alignment holes 42, 44, 46 are automatically and coaxially aligned with the rest three mounting holes 15, 16, 17. Therefore, the vehicle fan motor of the present invention into either the three-hole structural electric fan assembly or the four-hole structural electric fan assembly 10, the machinist needs to align the first alignment hole 41 with the mounting hole 11, 14 only.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle fan motor for an electric fan assembly, comprising:

a motor housing;

a motor assembly enclosed in said motor housing, wherein a driving shaft is driven to rotate by said motor assembly and is extended out of said motor housing for coupling with said electric fan assembly; and a universal mounting arrangement, which is radially and outwardly extended from said motor housing for securely mounting said motor housing to said electric fan assembly to substantially retain said driving shaft in position, containing a first alignment hole, a second alignment hole spaced apart from said first alignment hole at a 90° arc angle, a third alignment hole spaced apart from said first alignment hole at a 120° arc angle, a fourth alignment hole spaced apart from said first alignment hole at a 180° arc angle, a fifth alignment hole spaced apart from said first alignment hole at a 240° arc angle, and a sixth alignment hole spaced apart from said first alignment hole at a 270° arc angle, wherein said motor housing is adapted for securely mounting to said electric fan assembly having three mounting holes when said first, third and fifth alignment holes of said universal mounting arrangement are coaxially aligned with said three mounting holes respectively, wherein said motor housing is adapted for securely mounting to said electric fan assembly having four mounting holes when said first, second, fourth and sixth alignment holes of said universal mounting arrangement are coaxially aligned with said four mounting holes respectively.

2. The vehicle fan motor, as recited in claim 1, wherein said universal mounting arrangement further comprises first through third mounting wings radially and outwardly extended from said motor housing, wherein said first alignment hole is formed on said first mounting wing, said second and third alignment holes are spacedly formed on said second mounting wing, and said fifth alignment hole is formed on said third mounting wing.

3. The vehicle fan motor, as recited in claim 1, wherein said motor housing comprises a front casing defining a motor cavity receiving said motor assembly therein and a rear cover covering said front casing to enclose said motor cavity, wherein said universal mounting arrangement comprises a mounting ring sealedly mounted between said front casing and said rear cover, wherein said first through sixth alignment holes are spacedly and radially extended around said mounting ring.

4. The vehicle fan motor, as recited in claim 2, wherein said motor housing comprises a front casing defining a motor cavity receiving said motor assembly therein and a rear cover covering said front casing to enclose said motor cavity, wherein said universal mounting arrangement comprises a mounting ring sealedly mounted between said front casing and said rear cover, wherein said first through sixth alignment holes are spacedly and radially extended around said mounting ring.

5. The vehicle fan motor, as recited in claim 4, wherein said first through third mounting wings are radially and integrally extended from said mounting ring.

6. The vehicle fan motor, as recited in claim 2, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed on said first mounting wing at a position next to said first alignment hole to coaxially align between said first casing hole and said first covering hole, wherein said second retention hole is formed on said second mounting wing at a position between said second and third alignment holes to coaxially align between said second casing hole and said second covering hole, wherein said third retention hole is formed on said third mounting wing next to said fifth alignment hole to coaxially align between said third casing hole and said third covering hole.

7. The vehicle fan motor, as recited in claim 4, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed on said first mounting wing at a position next to said first alignment hole to coaxially align between said first casing hole and said first covering hole, wherein said second retention hole is formed on said second mounting wing at a position between said second and third alignment holes to coaxially align between said second casing hole and said second covering hole, wherein said third retention hole is formed on said third mounting wing next to said fifth alignment hole to coaxially align between said third casing hole and said third covering hole.

8. The vehicle fan motor, as recited in claim 5, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed on said first mounting wing at a position next to said first alignment hole to coaxially align between said first casing hole and said first covering hole, wherein said second retention hole is formed on said second mounting wing at a position between said second and third alignment holes to coaxially align between said second casing hole and said second covering hole, wherein said third retention hole is formed on said third mounting wing next to said fifth alignment hole to coaxially align between said third casing hole and said third covering hole.

9. The vehicle fan motor, as recited in claim 3, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed at a position next to said first alignment hole to coaxially align between said first casing hole and said first covering hole, wherein said second retention hole is formed at a position between said second and third alignment holes to coaxially align between said second casing hole and said second covering hole, wherein said third retention hole is formed next to said fifth alignment hole to coaxially align between said third casing hole and said third covering hole.

10. The vehicle fan motor, as recited in claim 4, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed at a position next to said first alignment hole to coaxially align between said first casing hole and said first covering hole, wherein said second retention hole is formed at a position between said second and third alignment holes to coaxially align between said second casing hole and said second covering hole, wherein said third retention hole is formed next to said fifth alignment hole to coaxially align between said third casing hole and said third covering hole.

11. The vehicle fan motor, as recited in claim 5, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed at a position next to said first alignment hole to coaxially align between said first casing hole and said first covering hole, wherein said second retention hole is formed at a position between said second and third alignment holes to coaxially align between said second casing hole and said second covering hole, wherein said third retention hole is formed next to said fifth alignment hole to coaxially align between said third casing hole and said third covering hole.

12. A vehicle fan motor for an electric fan assembly, comprising:

a motor housing;

a motor assembly enclosed in said motor housing, wherein a driving shaft is driven to rotate by said motor assembly and is extended out of said motor housing for coupling with said electric fan assembly; and a universal mounting arrangement, which is radially and outwardly extended from said motor housing for securely mounting said motor housing to said electric fan assembly to substantially retain said driving shaft in position, containing first through sixth alignment holes radially and spacedly extended from a circumferential side of said motor housing, wherein said vehicle fan motor is used for mounting to said electric fan assembly having three mounting holes that when said first alignment hole is coaxially aligned with one of said mounting holes, said third and fifth alignment holes of said universal mounting arrangement are automatically and coaxially aligned with said another two mounting holes respectively, wherein said vehicle fan motor is used for mounting to said electric fan assembly having four mounting holes that when said first alignment hole is coaxially aligned with one of said mounting holes, said second, fourth and sixth alignment holes of said universal mounting arrangement are automatically and coaxially aligned with said another three mounting holes respectively.

13. The vehicle fan motor, as recited in claim 12, wherein said universal mounting arrangement further comprises first through third mounting wings radially and outwardly extended from said motor housing, wherein said first alignment hole is formed on said first mounting wing, said second and third alignment holes are spacedly formed on said second mounting wing, and said fifth alignment hole is formed on said third mounting wing.

14. The vehicle fan motor, as recited in claim 12, wherein said motor housing comprises a front casing defining a motor cavity receiving said motor assembly therein and a rear cover covering said front casing to enclose said motor cavity, wherein said universal mounting arrangement comprises a mounting ring sealedly mounted between said front casing and said rear cover, wherein said first through sixth alignment holes are spacedly and radially extended around said mounting ring.

15. The vehicle fan motor, as recited in claim 13, wherein said motor housing comprises a front casing defining a motor cavity receiving said motor assembly therein and a rear cover covering said front casing to enclose said motor cavity, wherein said universal mounting arrangement comprises a mounting ring sealedly mounted between said front casing and said rear cover, wherein said first through sixth alignment holes are spacedly and radially extended around said mounting ring.

16. The vehicle fan motor, as recited in claim 15, wherein said first through third mounting wings are radially and integrally extended from said mounting ring.

17. The vehicle fan motor, as recited in claim 14, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed on said first mounting wing at a position next to said first alignment hole to coaxially align between said first casing hole and said first covering hole, wherein said second retention hole is formed on said second mounting wing at a position between said second and third alignment holes to coaxially align between said second casing hole and said second covering hole, wherein said third retention hole is formed on said third mounting wing next to said fifth alignment hole to coaxially align between said third casing hole and said third covering hole.

18. The vehicle fan motor, as recited in claim 16, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed on said first mounting wing at a position next to said first alignment hole to coaxially align between said first casing hole and said first covering hole, wherein said second retention hole is formed on said second mounting wing at a position between said second and third alignment holes to coaxially align between said second casing hole and said second covering hole, wherein said third retention hole is formed on said third mounting wing next to said fifth alignment hole to coaxially align between said third casing hole and said third covering hole.

19. The vehicle fan motor, as recited in claim 14, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed at a position next to said first alignment hole to coaxially align between said first casing hole and said first covering hole, wherein said second retention hole is formed at a position between said second and third alignment holes to coaxially align between said second casing hole and said second covering hole, wherein said third retention hole is formed next to said fifth alignment hole to coaxially align between said third casing hole and said third covering hole.

20. The vehicle fan motor, as recited in claim 16, wherein said front casing contains three casing holes extended radially and said rear cover contains at least three corresponding covering holes extended radially to coaxially align with said casing holes respectively, wherein said universal mounting arrangement further contains first through third retention holes, wherein said first retention hole is formed at a position next to said first alignment hole to coaxially align between said first casing hole and said first covering hole, wherein said second retention hole is formed at a position between said second and third alignment holes to coaxially align between said second casing hole and said second covering hole, wherein said third retention hole is formed next to said fifth alignment hole to coaxially align between said third casing hole and said third covering hole.

* * * * *